United States Patent [19]
Knecht et al.

[11] Patent Number: 5,390,041
[45] Date of Patent: Feb. 14, 1995

[54] FIBER OPTIC CHANNEL EXTENDER INTERFACE METHOD AND APPARATUS

[75] Inventors: Kevin M. Knecht, Chippewa Falls; Eric C. Fromm, Eau Claire, both of Wis.

[73] Assignee: Cray Research, Inc., Eagan, Minn.

[21] Appl. No.: 788,496

[22] Filed: Nov. 6, 1991

[51] Int. Cl.$^6$ .......................................... H04B 10/12
[52] U.S. Cl. .................. 359/158; 359/161; 375/114
[58] Field of Search ............... 359/135, 154, 158, 161, 359/173; 375/114; 371/53, 95053887345

[56] References Cited

U.S. PATENT DOCUMENTS

| | | | |
|---|---|---|---|
| 4,748,617 | 5/1988 | Drewlo | 359/158 |
| 4,771,440 | 9/1988 | Fromm | 375/52 |
| 4,791,407 | 12/1988 | Prucnal et al. | 341/68 |
| 4,831,622 | 5/1989 | Kuhn | 455/600 |
| 5,018,152 | 5/1991 | Simcoe | 359/154 |

OTHER PUBLICATIONS

ANSI® X3.148-1988, "American National Standard for Information Systems—Fiber Distributed Data Interface (FDDI)—Token Ring Physical Layer Protocol (PHY)," Computer and Business Equipment Manufacturers Association, American National Standards Institute, Inc. (1988).

*Primary Examiner*—Leslie Pascal
*Attorney, Agent, or Firm*—Daniel J. Kluth

[57] ABSTRACT

A digital optical serial communication system and encoding method comprises a transmitter responsive to an input of parallel information for parsing the information into 4-bit groups. The 4-bit groups are encoded into 5-bit codes having a 40/60 duty cycle and wherein no more than two consecutive bits are logical 1's or 0's on either end of the 5-bit code. The 5-bit codes are serially transmitted by an optical transmission medium for providing a conduit from the transmitter to a receiver. The receiver receives and decodes the serial information to 4-bit groups. The 4-bit groups are concatenated to form a parallel packet of information suitable for data processing. The encoding/decoding scheme has the advantages of (1) a worst case duty factor of 40/60%; (2) a maximum run of bits without transition equal to five; (3) an easily recaptured framing of packets due to a unique sync symbol; and (4) simple encoding and decoding of packets using combinational logic rather than lookup tables. In addition, data can be continuously sent via a communications protocol.

5 Claims, 6 Drawing Sheets

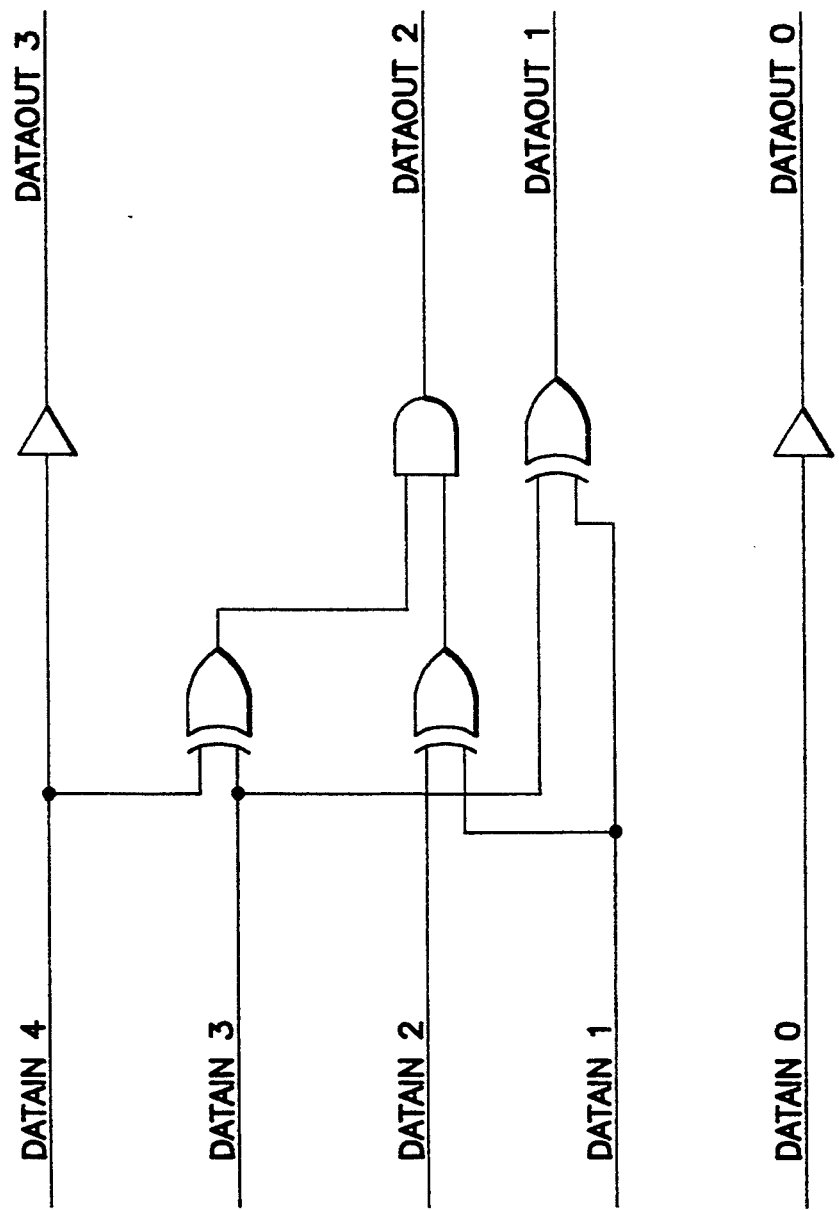
FIG. 6  5 TO 4 BIT DECODER

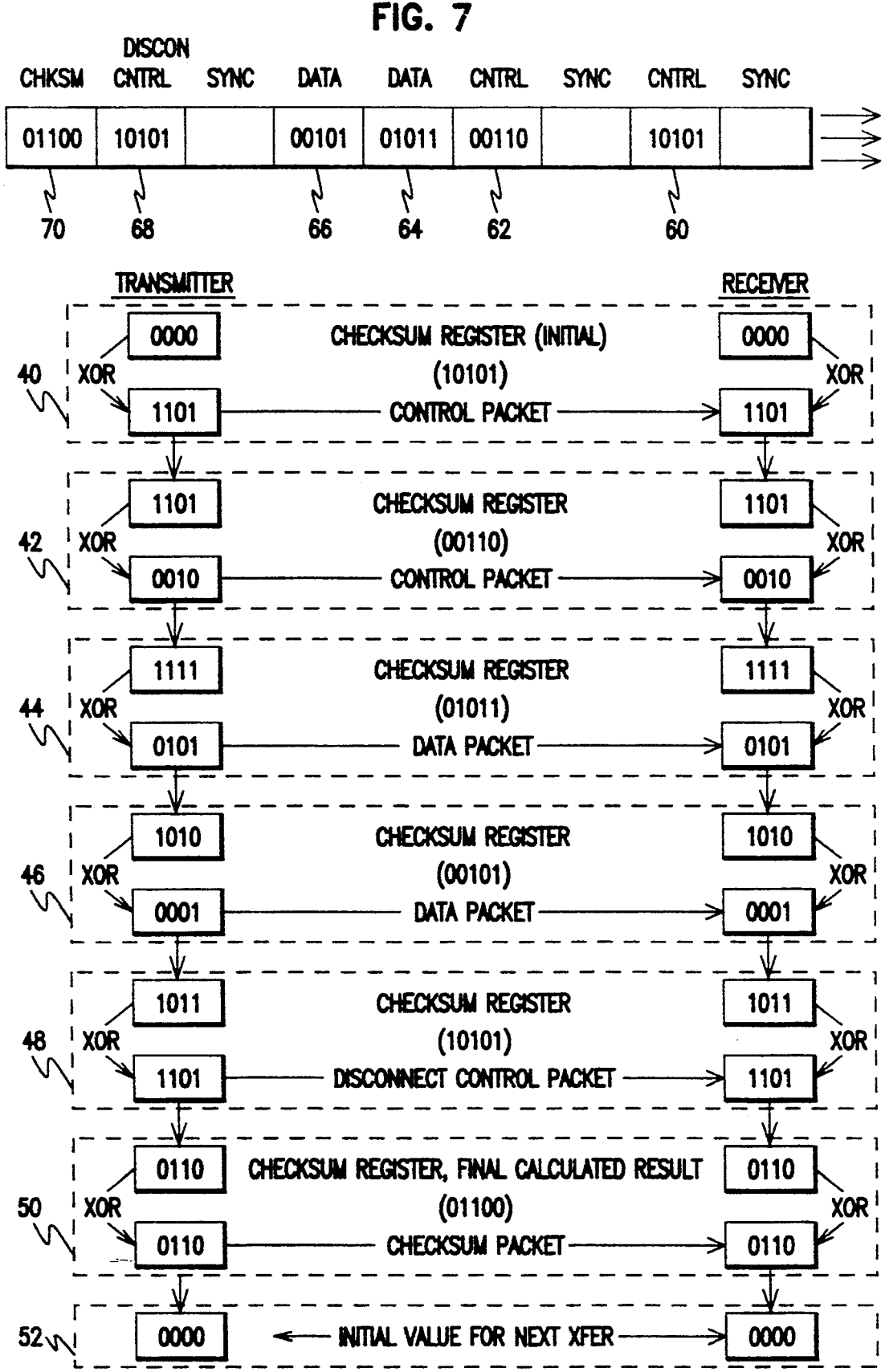

FIBER OPTIC CHANNEL EXTENDER INTERFACE METHOD AND APPARATUS

FIELD OF THE INVENTION

This invention generally relates to high speed serial digital communications and, more particularly to a fiber optic channel extender interface apparatus and encoding method for serial digital data communication between remote devices, such as between a mainframe computer and a peripheral device.

BACKGROUND OF THE INVENTION

Digital systems frequently require communication with remotely located input-output (I/O) devices. The I/O devices must communicate with a master device as well as between themselves over electrical cables or other mediums. For example, a data processing system generally comprises a master controller with one or more devices connected to it. Typical devices include, but are not limited to, magnetic disk drives, magnetic bubble memories and solid state storage devices. The sophistication and speed of these devices are limited by conventional communication links.

A prior art technique to communicate information between devices includes converting parallel information into a serial stream of electrical pulses and transmitting the stream sequentially through an electrically conductive medium such as a twisted-pair or coaxial cable. On a receiving end, the serial stream of pulses are reconstituted back into parallel form suitable for data processing use. This technique works relatively well with slow data rates but becomes less than ideal at data rates now required. One problem with utilizing mediums such as a twisted-pair or coaxial cable is that the bandwidth of the communication channel is limited due to the inductance, capacitance and resistance per unit length. Another problem is the so-called "ground loop" problem. That is, the "grounds" of the various interconnected devices are not precisely at the same potential. The differences in potential result in currents in the interconnecting cable grounds, adversely affecting communication. Further, such ground currents cause electromagnetic radiation which further impede accurate communication.

Optical digital communication systems have been developed which obviate ground loops and permit large amounts of information to be transmitted over a single channel. While optical communication systems have a tremendous advantage in comparison to electrical or electromagnetic mediums, they are nevertheless subject to problems such as noise and signal attenuation. Means for overcoming these impairments include encoding the information to be transmitted in a manner which allows detection of information which has been corrupted. These encoding methods can be complex and require substantial overhead thus slowing down the effective information transfer rate.

In the present invention, a digital encoding method and apparatus suitable for high speed serial data transfer requiring minimal overhead is disclosed.

SUMMARY OF THE INVENTION

The present invention is a digital communication system which includes a cache for storing information to be transmitted. Packets of parallel information are parsed into multiple 4-bit nibbles. Each 4-bit nibble is encoded into a 5-bit code wherein no more than two consecutive bits on either end of the 5-bit codes are logical 1's or 0's. The 5-bit codes are serially transmitted through an optical medium such as a fiber optic link terminating in a receiving section. The receiving section reconstitutes the serial stream into multiple 5-bit codes. The 5-bit codes are decoded into 4-bit nibbles and the 4-bit nibbles are concatenated into parallel packet form.

A communications protocol is established with data packets, control packets, checksum packets, and synchronization symbols. One of the control packets is transmitted after a synchronization symbol is transmitted. One of the synchronization symbols, data packets, or checksum packets is transmitted after one of the control packets is transmitted. One of the synchronization symbols is transmitted after one of the checksum packets is transmitted, and one of the synchronization symbols or another of the data packets is transmitted after one of the data packets is transmitted.

For a better understanding of the invention, as well as other objects and further features thereof, reference is had to the following detailed description of the preferred embodiment taken in conjunction with accompanying drawings.

BRIEF DESCRIPTION OF THE DRAWINGS

Referring now to the drawings in which like reference numbers represent corresponding parts throughout:

FIG. 6 is a logic diagram illustrating 5-bit to 4-bit decoding; and

FIG. 7 is a block diagram illustrating data transmission verification with checksum calculation.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
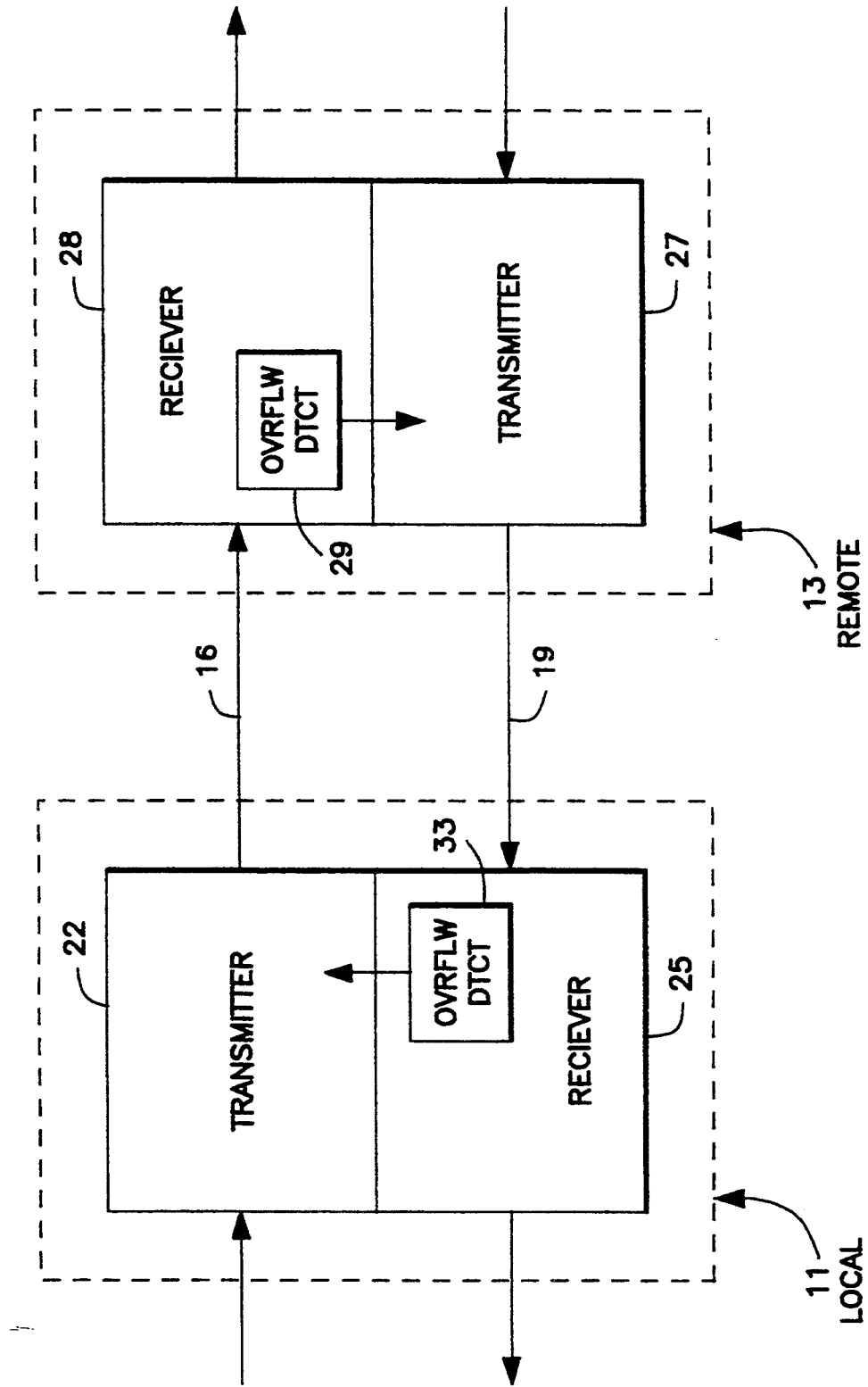
FIG. 1 is a block diagram of a full duplex communication system.

Referring now to FIG. 1, a block diagram of a fiber optic digital communication system is shown having a local end 11 and a remote end 13. Local end 11 includes local transmitter 22 and local receiver 25. Remote end 13 includes remote receiver 28 and remote transmitter 27. The local end 11 and remote end 13 operate as a full duplex system simultaneously transmitting and receiving serial information via serial fiber optic channels 16 and 19. Both local end 11 and remote end 13 include overflow detectors, 33 and 29, respectively, to prevent overflow conditions as will be described further below.

Figure 2:
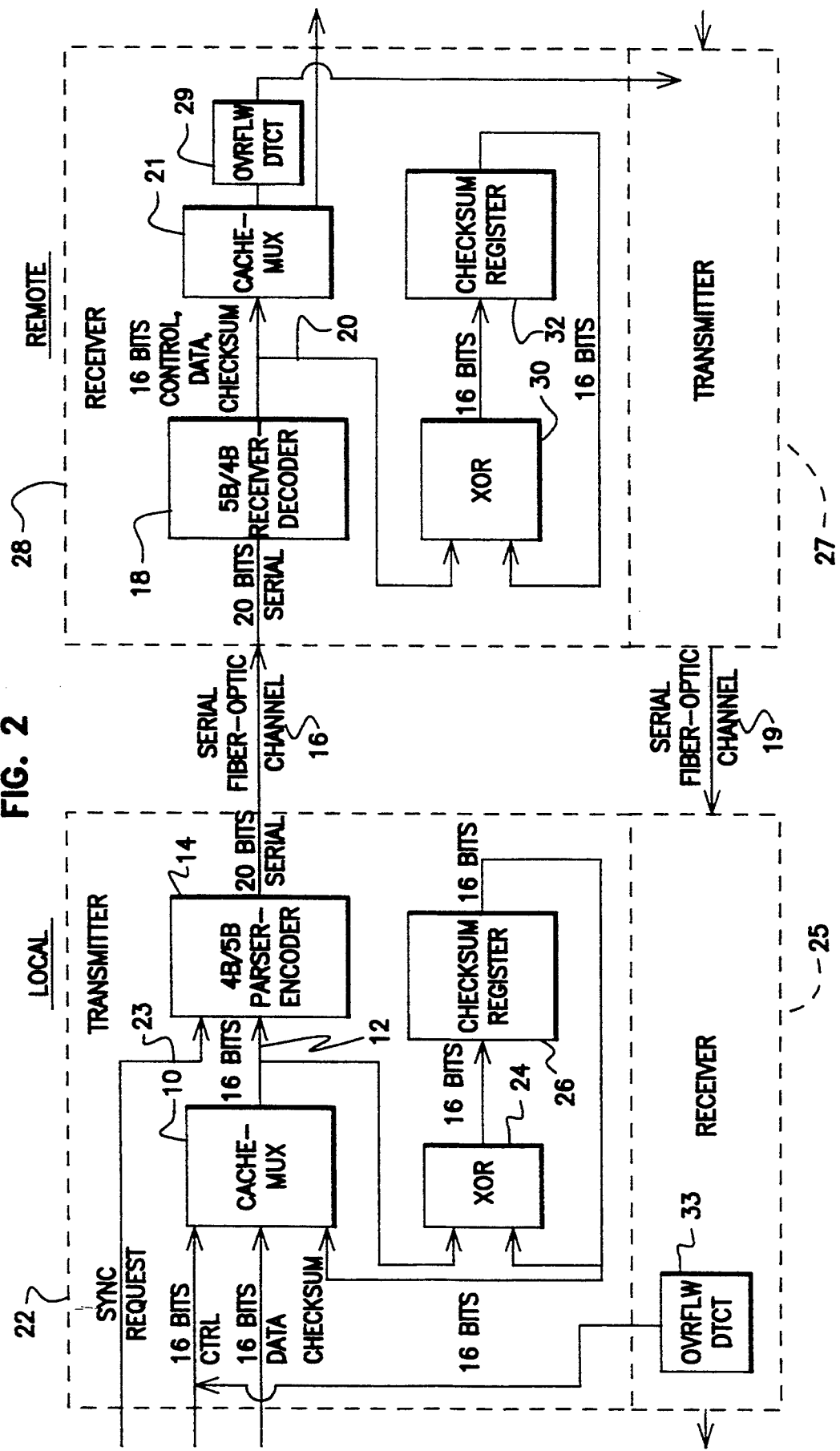
FIG. 2 is a block diagram of a fiber optic digital communication system in accordance with the present invention.

FIG. 2 illustrates a block diagram further detailing a portion of FIG. 1 for transmission of data by way of serial fiber optical channel 16. The transmission of data from local transmitter 22 to remote receiver 28 will be further described with reference to FIG. 2. Cache-multiplexer 10 of local transmitter 22 stores control, data and checksum information in parallel form and multiplexes it onto bus 12. Parser-encoder 14 parses the information on bus 12 into multiple 4-bit nibbles, encodes each 4-bit nibble into a 5-bit code and transmits the 5-bit codes in a serial stream over serial fiber optic channel 16 in a 20-bit block size. The serial stream of information is received in receiver-decoder 18. The information is reconstituted into a 5-bit parallel form, decoded into multiple 4-bit nibbles and reassembled into a parallel form packet.

The local transmitter 22 comprises a cache-multiplexer 10, a parser-encoder 14, a transmit logical exclusive OR (XOR) array 24, and a transmit checksum register 26 for storing the results of a tallied error checksum calculation. The parser-encoder 14 generates synchronization symbols, parses parallel information into multiple 4-bit nibbles, encodes each 4-bit nibble into a 5-bit code, constructs a serial bit stream and transmits the serial bit stream.

The remote receiver 28 comprises a receiver-decoder 18, a receive logical exclusive OR (XOR) array 30, and a receive checksum register 32 for accumulating results of an error checksum calculation. The receiver-decoder 18 receives incoming serial information, reconstitutes the serial information into multiple 5-bit codes, decodes each 5-bit code into a 4-bit nibble, concatenates a plurality of 4-bit nibbles into a multiple bit packet, and identifies the packet as either control, data or checksum information.

Communication protocol is established and maintained with four signals, namely: sync symbol, data packet, control packet, and checksum packet. In the preferred embodiment, control, data and checksum packets comprise 16 bits of information before encoding and 20 bits after encoding. It can be appreciated by those skilled in the art that the 16 bit packet size is not exclusive and any packet size of an integer multiple of four is accommodated by the present invention.

Four rules govern communication protocol:

(1) A sync symbol is followed by a control packet.
(2) A control packet is followed by a sync symbol, a data packet, if data is available, or a checksum packet, if the control packet was a disconnect control packet.
(3) A checksum packet is followed by a sync symbol.
(4) A data packet is followed by a sync symbol or another data packet, if data is available and there is no other reason to interrupt the communication of data.

Figure 3:
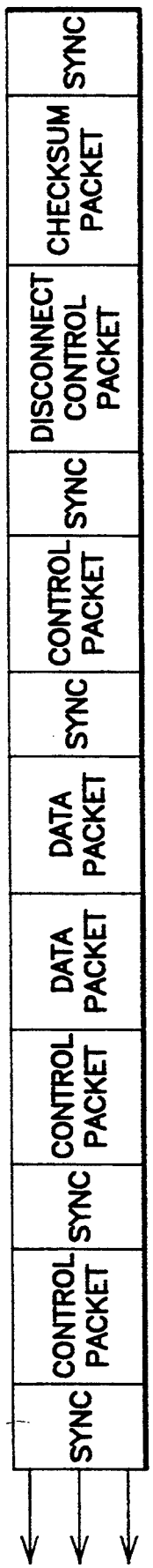
FIG. 3 is a block diagram of an exemplary bit stream illustrating the communication protocol of data packets, control packets, checksum packets and sync symbols.

Adherence to the aforementioned protocol allows remote receiver 28 to distinguish between data, control and checksum packets without the need of an identifying bit in each packet. Data can be continuously sent via this communication protocol. FIG. 3 represents an exemplary serial bit stream conforming to the communication protocol.

Referring again to FIG. 2, the parser-encoder 14 generates a 5-bit sync symbol in response to either a request on sync request line 23 or when the data cache of cache-multiplexer 10 is empty. Request line 23 to parser-encoder 14 is asserted when a "hard" re-synchronization or interruption to send control packet is desired. As long as the data cache is empty, parser-encoder 14 generates a 5-bit sync symbol and serially transmits it followed by a control packet through fiber optic channel 16. The control packet is read from cache-multiplexer 10, parsed into multiple 4-bit nibbles, each nibble is encoded into a 5-bit code, and then serially sent through the fiber optic channel 16. The transmission of a sync symbol followed by a control packet is repeated until data enters cache-multiplexer 10.

When parser-encoder 14 detects data in the cache, it prepares for data transmission by re-synchronizing, that is, it transmits a sync symbol followed by a control packet. The data in cache-multiplexer 10 is then parsed into multiple 4-bit nibbles, each nibble is then encoded into 5-bit codes and the 5-bit codes are serially transmitted through fiber optic channel 16, the highest order bit of the highest order 5-bit code first. As long as cache-multiplexer 10 has data, a data packet is transmitted followed by another data packet.

As shown in FIG. 1 and FIG. 2, if a receiver cache of local receiver 25 (cache not shown) or cache 21 of remote receiver 28 becomes full, data transmission from the respective transmitter, 27 or 22, must be interrupted to prevent an overflow condition. If data cache 21 of remote receiver 28 becomes full, interruption occurs by overflow detector 29 of remote receiver 28 inserting an overflow bit into a control packet. The control packet is then transmitted in the data stream by remote transmitter 27 through serial fiber optic channel 19. The control packet with the overflow bit is received by local receiver 25 and local transmitter 22, via input from receiver 25 applied to the 16 bit input control line for cache multiplexer 10, is told to stop transmitting data until data cache 21 of remote receiver 28 is sufficiently empty to accommodate more data without an overflow condition.

Likewise, when data cache (not shown) of local receiver 25 becomes full, overflow detector 33 of local receiver 25 inserts an overflow bit into a control packet. The control packet is then transmitted by local transmitter 22. The control packet with the overflow bit is received by remote receiver 28 and tells remote transmitter 27 to stop transmitting data until the data cache of local receiver 25 is sufficiently empty to accommodate more data.

When the data cache of cache-multiplexer 10 becomes empty, idling occurs until cache-multiplexer 10 receives more data or a control packet indicating disconnect is asserted. A disconnect control packet is followed by a packet containing the error checksum stored in transmit checksum register 26.

Figure 4:
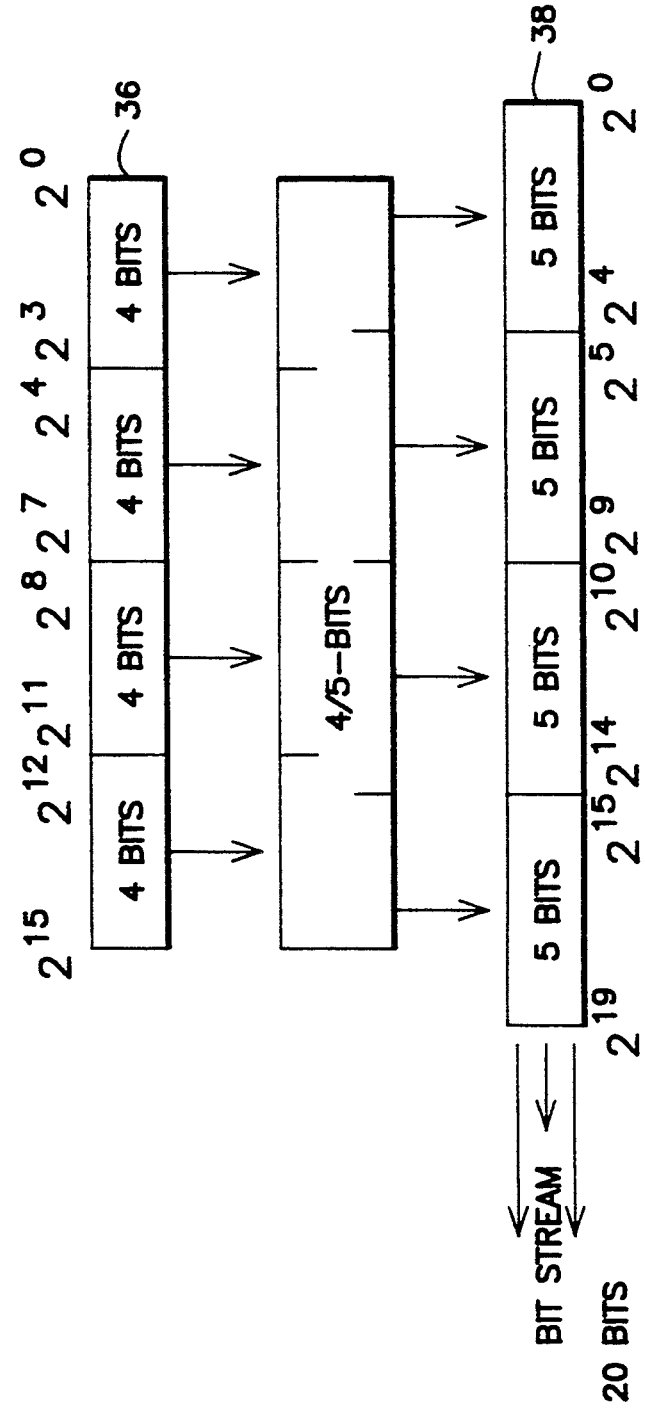
FIG. 4 is a block diagram illustrating the parsing of a 16-bit packet into four 4-bit nibbles, encoding of the four 4-bit nibbles into four 5-bit codes and the serial transmission of a 20-bit block.

FIG. 4 illustrates the operation of parser-encoder 14. A 16-bit packet 36 is parsed into four 4-bit nibbles, each nibble is encoded into a 5-bit code and is serially transmitted in a 20-bit block 38. Decoding of the serial bit stream operates in a similar manner but in the reverse order.

Figure 5:
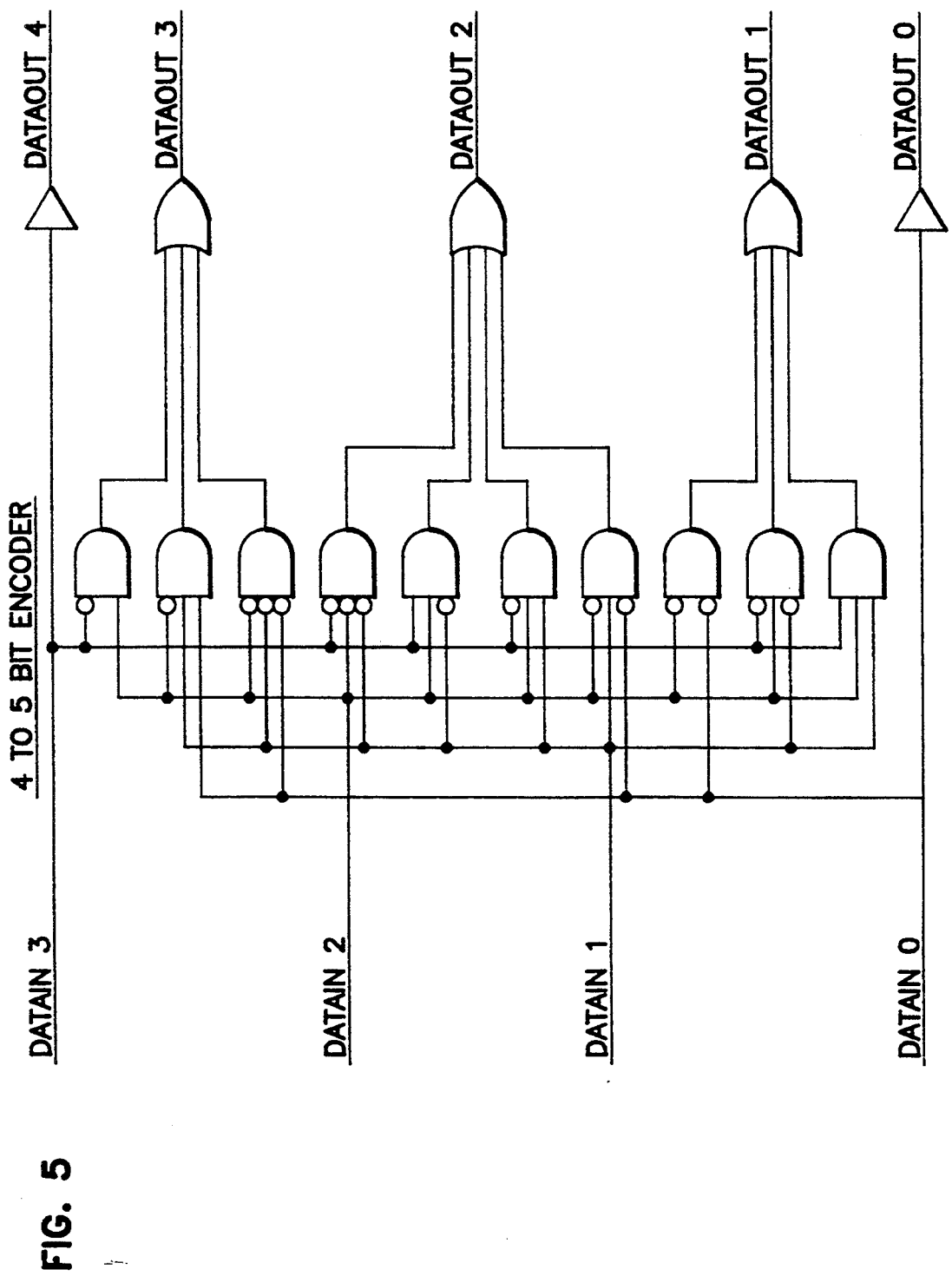
FIG. 5 is a logic diagram illustrating 4-bit to 5-bit encoding.

FIG. 5 diagrams the combinational logic for encoding a 4-bit nibble into a 5-bit code. FIG. 6 diagrams the combinational logic for decoding the 5-bit code back to a 4-bit nibble. The 5-bit codes, with the exception of the sync symbol, are formatted in a 40/60 percent ratio of 0 and 1 bits, with either end of the 5-bit code being made up of no more than two logical "0" or "1" bits.

TABLE 1

| 5-BIT CODE | | | | | 4-BIT CODE | | | | DEFINITION |
|---|---|---|---|---|---|---|---|---|---|
| 4 | 3 | 2 | 1 | 0 | 3 | 2 | 1 | 0 | |
| 0 | 0 | 0 | 0 | 0 | X | X | X | X | SYNC |
| 0 | 0 | 0 | 0 | 1 | X | X | X | X | INVALID |
| 0 | 0 | 0 | 1 | 0 | X | X | X | X | INVALID |
| 0 | 0 | 0 | 1 | 1 | X | X | X | X | INVALID |
| 0 | 0 | 1 | 0 | 0 | X | X | X | X | INVALID |
| 0 | 0 | 1 | 0 | 1 | 0 | 0 | 0 | 1 | HEX 1 |
| 0 | 0 | 1 | 1 | 0 | 0 | 0 | 1 | 0 | HEX 2 |
| 0 | 0 | 1 | 1 | 1 | X | X | X | X | INVALID |
| 0 | 1 | 0 | 0 | 0 | X | X | X | X | INVALID |
| 0 | 1 | 0 | 0 | 1 | 0 | 0 | 1 | 1 | HEX 3 |
| 0 | 1 | 0 | 1 | 0 | 0 | 1 | 0 | 0 | HEX 4 |
| 0 | 1 | 0 | 1 | 1 | 0 | 1 | 0 | 1 | HEX 5 |
| 0 | 1 | 1 | 0 | 0 | 0 | 1 | 1 | 0 | HEX 6 |
| 0 | 1 | 1 | 0 | 1 | 0 | 1 | 1 | 1 | HEX 7 |
| 0 | 1 | 1 | 1 | 0 | 0 | 0 | 0 | 0 | HEX 0 |
| 0 | 1 | 1 | 1 | 1 | X | X | X | X | INVALID |
| 1 | 0 | 0 | 0 | 0 | X | X | X | X | INVALID |
| 1 | 0 | 0 | 0 | 1 | 1 | 0 | 0 | 1 | HEX 9 |
| 1 | 0 | 0 | 1 | 0 | 1 | 1 | 1 | 0 | HEX E |
| 1 | 0 | 0 | 1 | 1 | 1 | 1 | 1 | 1 | HEX F |
| 1 | 0 | 1 | 0 | 0 | 1 | 1 | 0 | 0 | HEX C |
| 1 | 0 | 1 | 0 | 1 | 1 | 1 | 0 | 1 | HEX D |
| 1 | 0 | 1 | 1 | 0 | 1 | 0 | 1 | 0 | HEX A |
| 1 | 0 | 1 | 1 | 1 | X | X | X | X | INVALID |
| 1 | 1 | 0 | 0 | 0 | X | X | X | X | INVALID |
| 1 | 1 | 0 | 0 | 1 | 1 | 0 | 1 | 1 | HEX B |
| 1 | 1 | 0 | 1 | 0 | 1 | 0 | 0 | 0 | HEX 8 |
| 1 | 1 | 0 | 1 | 1 | X | X | X | X | INVALID |
| 1 | 1 | 1 | 0 | 0 | X | X | X | X | INVALID |
| 1 | 1 | 1 | 0 | 1 | X | X | X | X | INVALID |
| 1 | 1 | 1 | 1 | 0 | X | X | X | X | INVALID |
| 1 | 1 | 1 | 1 | 1 | X | X | X | X | SYNC |

Table 1 illustrates the relationship between 4-bit nibbles and their corresponding 5-bit codes. The 40/60 percent ratio relationship exists in the 5-bit codes in that there is a 3-2 relationship of "0" and "1" bits in each valid code. The 40/60 ratio insures that the fiber optic components do not saturate. To implement the 40/60 code and to ensure that the concatenation of any two consecutive 5-bit codes will not result in a false sync symbol being detected since a sync symbol is recognized as any group of five consecutive logical "0" or "1" bits, the code of Table 1 is used.

If a 5-bit code contained more than two consecutive bits on either end, the possibility of five consecutive bits in a serial bit stream could occur thus showing up as a false sync symbol. The use of five consecutive bits as a sync symbol allows sync to be readily detectable, regardless of its position in the serial stream. Two representations of sync symbols namely 00000 and 11111 are necessary. The framing of packets is easily recaptured due to the unique sync symbol characteristics. The sync symbol is coded in accordance with the last bit of the preceding packet to insure that the coincidence of a trailing bit in the packet and the initial bit in the sync symbol does not lead to a false interpretation of a sync symbol That is, if the last bit in a packet is a "1" the sync symbol is coded all "0's" and conversely, if the last bit is a "0", the sync symbol is coded all "1's".

The control packet has a reserved bit, the highest order bit of the control packet, to identify polarity of a preceding sync symbol. If the sync symbol preceding the control packet is all "0's" this bit is forced to a "1" Likewise, if the sync symbol preceding the control packet is all "1's" this bit is forced to a "0". There is direct correspondence between the 4-bit group and 5-bit code representation of the highest ordered bit.

Several advantages result from the encoding/decoding scheme of the present invention. First, the worst case duty factor is equal to 40/60%. Second, the maximum run of bits without a transition is equal to five. Third, the framing of packets are easily recaptured due to the unique sync symbol. Lastly, simple encoding and decoding of the packets using combinational logic rather than lookup tables is accomplished.

Referring now to FIG. 7, a flow diagram illustrates an operation for verifying data transmission by comparing a checksum packet to a calculated checksum. The checksum calculation is a logical exclusive OR operation (XOR). It is performed at the transmit end on 16 bit packets prior to 4 to 5-bit encoding, and on 16-bit packets at the receive end following 5-bit to 4-bit decoding.

To simplify explanation, FIG. 7 illustrates fictitious 5-bit packets in place of the 20-bit packets. Transmit checksum register 26 and receive checksum register 32 are set to zero prior to initial transmission. At first step 40, a first encoded control packet 60 (10101) is sent from transmitter 22 to receiver 28. On the transmitter side, the initial contents of transmit checksum register 26 (0000) are XORed with the contents of first control packet 60, before encoding, (1101) with the result (1101) entered back into the transmit checksum register 26. On the receiver side, the initial contents of receive checksum register 32 (0000) are XORed with the contents of the first decoded received control packet 60 (1101) with the result (1101) entered back into the receive checksum register 32.

At second step 42, a second encoded control packet 62 (00110) is sent from transmitter 22 to receiver 28. On the transmitter side, the contents of transmit checksum register 26 (1101) are XORed with the contents of second control packet 62, before encoding, (0010) with the result (1111) entered back into the transmit checksum register 26. On the receiver side, the contents of receive checksum register 32 (1101) are XORed with the contents of the second decoded received control packet 62 (0010) with the result (1111) entered back into the receive checksum register 32.

At third step 44, a first encoded data packet 64 (10011) is sent from transmitter 22 to receiver 28. On the transmitter side, the contents of transmit checksum register 26 (1111) are XORed with the contents of first data packet 64, before encoding (0101) with the result (1010) entered back into the transmit checksum register 26. On the receiver side, the contents of receive checksum register 32 (1111) are XORed with the contents of the first decoded received data packet 64 (0101) with the result (1010) entered back into the receive checksum register 32.

At fourth step 46, a second encoded data packet 66 (00101) is sent from transmitter 22 to receiver 28. On the transmitter side, the contents of transmit checksum register 26 (1010) are XORed with the contents of second data packet 66, before encoding, (0001) with the result (1011) entered back into the transmit checksum register 26. On the receiver side, the contents of receive checksum register 32 (1010) are XORed with the contents of the second decoded received data packet 66 (0001) with the result (1011) entered back into the receive checksum register 32.

At fifth step 48, a disconnect encoded control packet 68 (10101) is sent from transmitter 22 to receiver 28. On the transmitter side, the contents of transmit checksum register 26 (1011) are XORed with the contents of disconnect control packet 68, before encoding, (1101) with the result (0110) entered back into the transmit checksum register 26. On the receiver side, the contents of receive checksum register 32 (1011) are XORed with the contents of received decoded disconnect control packet 68 (1101) with the result (0110) entered back into the receive checksum register 32.

At sixth step 50, the contents of transmit checksum register 26 (0110) is read as a checksum packet 70 (01100) and is sent from transmitter 22 to receiver 28. On the transmitter side, the contents of transmit checksum register 26 (0110) are XORed with the contents of checksum packet 70, before encoding, (0110) with the result (0000) entered back into the transmit checksum register 26. On the receiver side, the contents of receive checksum register 32 (0110) are XORed with the contents of received decoded checksum packet 70 (0110) with the result (0000) entered back into the receive checksum register 32. The seventh step 52, illustrates that transmit checksum register 26 and receive checksum register 32 are zeroed out if an error free transmission and reception occurs.

Although the detailed description of the preferred embodiment of the invention has been set forth herein for the purpose of explaining the principles thereof, it is known that there may be modifications, variation or change in the invention without departing from the proper scope of the invention and the claims thereto.

We claim:

1. A digital communication system having a transmitter, receiver, and an optical transmission medium comprising:
   (a) caching means of said transmitter for storing binary information in a plurality of packets including control, data and checksum packets;
   (b) means coupled to said caching means for calculating error checksum values on said binary information;
   (c) means for parsing said control, data and checksum packets into 4-bit groups;
   (d) encoding means for encoding each 4-bit group into a 5-bit code;
   (e) means coupled to said encoding means for generating 5-bit sync symbols;
   (f) means of said transmitter coupled to said optical transmission medium for serially combining and transmitting a serial bit stream including said 5-bit codes, sync symbols and error checksum values;
   (g) means of said receiver coupled to said optical transmission medium for receiving said serial bit stream and for reconstituting 5-bit codes from said serial bit stream;
   (h) means for decoding said 5-bit codes into 4-bit groups; and
   (i) means for calculating error checksum values on said 4-bit groups;
   (j) means for linking said 4-bit groups into parallel packet form for data processing use.

2. A digital communication system according to claim 1 wherein the control packet includes a reserved bit that is predetermined by the polarity of a preceding sync symbol.

3. A digital communications system according to claim 1, wherein said means for calculating error checksum values further comprises means, disengaged by a disconnect control packet, for sequentially performing a logical exclusive OR (XOR) function between said packets of information and checksum values of a checksum register to form new checksum values, said new checksum values replacing said checksum values.

4. A digital communication system according to claim 1, wherein said means for generating a 5-bit sync symbol further comprises means for predetermining sync symbol polarity based upon polarity of a preceding information bit.

5. A digital communication system according to claim 1, wherein said control packets include an overflow bit for indicating when said caching means is in a full condition.

* * * * *